June 21, 1932.   R. B. FRANKLIN   1,864,424
COTTER PIN
Filed Jan. 29, 1931

Inventor
R. B. Franklin
By Watson E. Coleman
Attorney

Patented June 21, 1932

1,864,424

UNITED STATES PATENT OFFICE

ROBERT B. FRANKLIN, OF MOUNT VERNON, WASHINGTON

COTTER PIN

Application filed January 29, 1931. Serial No. 512,114.

This invention relates to a cotter pin, and it is an object of the invention to provide a device of this kind comprising opposing engaging planes reducing the pin to its minimum diameter but operating when the pin is driven into place to enlarge the pin to assure desired fitting within the hole through which the pin is inserted.

Another object of the invention is to provide a pin of this kind embodying the use therealong of a series of inclined planes coacting in a manner to assure uniform expansion throughout the length of the pin.

It is also an object of the invention to provide a pin of this kind which can be readily stamped out of a single piece of material and which has one face of such material substantially from end to end provided with a series of inclined planes all of which being similar with one of such inclined planes immediately adjacent to the other, said inclined planes assuring desired uniform expansion of the pin when driven into place and also facilitating the desired bending or flexing of the pin as the work may require.

The invention consists in the details of construction and in the combination and arrangement of the several parts of my improved cotter pin whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

As disclosed in the accompanying drawing, my improved cotter pin comprises a single length L of material of suitable gauge and which is substantially semi-circular in cross section, said length of material being returned upon itself to provide overlying legs connected by a head or loop. This length L is of a material which will fully comply with the requirements of practice and the flat face theerof from end to end is provided with a plurality of inclined planes 1 providing toothed projections. These planes 1 are similar and each of said planes is immediately adjacent to another so that there is no intervening portions therebetween.

The low points 2 of the planes 1 provide at spaced points along the length L locations whereby the desired bending or flexing of the length L may be materially facilitated.

Figure 1:
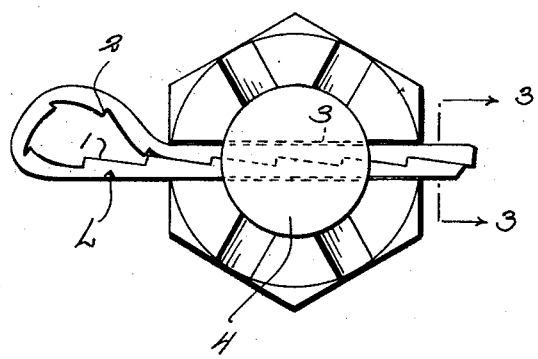
Figure 1 is an elevational view of a cotter pin constructed in accordance with an embodiment of my invention in applied position but before expansion.

In practice, the free end portions of the length L for a desired extent are arranged in overlying relation with the opposed planes 1 in contact. These overlying portions are then inserted through the work as illustrated in Figure 1, after which the pin is tightly driven into the opening 3 of the bolt 4 or other work.

Figure 2:
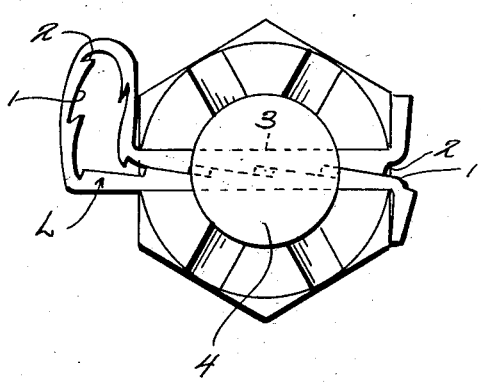
Figure 2 is a view similar to Figure 1 showing the pin in working or effective assembly.
Figure 3:
Figure 3 is a sectional view taken substantially on the line 3—3 of Figure 1.

This driving results in one end portion of the length to have movement independently of the opposite end portion, and the opposed inclined planes result in a uniform expansion of the portions of the length L or pin within the opening at all points within such opening, thus assuring a quick expansion with a resultant tight engagement of the pin within the opening. After the pin has been properly driven within the opening 3 the looped end portion may be readily flexed to one side as a result of the low portions 2 of the inclined planes of said looped portion so that said looped portion as illustrated in Figure 2 provides effective holding means for the pin at one side of the work. The free extremities of the overlying portions of the pin projecting beyond the opposite side of the work may be readily bent or flexed outwardly as illustrated in Figure 2 to provide an effective holding means at that side of the work. This flexing or bending of the extremities of the pin is also facilitated by the low points 2 of the inclined planes 1.

From the foregoing description it is thought to be obvious that a cotter pin constructed in accordance with my invention is particularly well adapted for use by reason of the convenience and facility with which it may be assembled and operated, and it will also be obvious that my invention is susceptible of some change and modificaton without departing from the principles and spirit thereof and for this reason I do not wish to be understood as limiting myself to the precise arrangement and formation of the several parts herein shown in carrying out my invention in practice except as hereinafter claimed.

I claim:—

1. As a new article of manufacture, a cotter pin comprising overlying legs and a connecting loop therefor, said legs and loop being provided along their inner faces with toothed projections, the toothed projections of one leg coacting with the toothed projections of the other leg to effect separation of the legs upon relative lengthwise movement of one leg with respect to the other.

2. As a new article of manufacture, a cotter pin comprising overlying legs and a connecting loop therefor, said legs and loop being provided along their inner faces with toothed projections, the toothed projections of one leg coacting with the toothed projections of the other leg to effect separation of the legs upon relative lengthwise movement of one leg with respect to the other, the toothed projections providing low points spaced along the legs and loop to facilitate bending.

3. As a new article of manufacture, a cotter pin comprising a pair of leg members connected together at one end, and complementary cam means carried by the opposing faces of said members intermediate each end for moving said members laterally and in parallel relation to each other simultaneously with longitudinal movement of one leg relative to the other.

4. As a new article, a cotter pin comprising parallel leg members connected together at one end, and co-acting means carried by the confronting portions of said members intermediate each end thereof whereby to move the member laterally in parallel relation to each other coactive with longitudinal movement of one leg relative to the other.

In testimony whereof I hereunto affix my signature.

ROBERT B. FRANKLIN.